United States Patent [19]
Suzuki

[11] 3,730,345
[45] May 1, 1973

[54] COMPRESSION FILTER PRESS PROVIDED WITH EXPANSIBLE AND CONTRACTIBLE CONNECTING TUBES IN SLURRY PASSAGES

[75] Inventor: Mikio Suzuki, Handa, Japan

[73] Assignee: NGK Insulators Ltd., Nagoya, Japan

[22] Filed: Apr. 12, 1971

[21] Appl. No.: 133,003

[30] Foreign Application Priority Data

Sept. 22, 1970 Japan ................................. 45/82522

[52] U.S. Cl. ................................................. 210/231
[51] Int. Cl. ............................................... B01d 25/12
[58] Field of Search ....................... 100/198; 285/298, 285/299, 302, 226; 210/224–231

[56] References Cited

UNITED STATES PATENTS

| | | | |
|---|---|---|---|
| 3,342,123 | 9/1967 | Ermakov et al. | 210/225 |
| 1,112,674 | 10/1914 | Burger | 210/231 X |
| 2,886,066 | 5/1959 | Hansen | 285/226 X |
| 3,313,319 | 4/1967 | Osborn et al. | 285/226 X |
| 373,432 | 11/1887 | Benjamin | 285/302 X |
| 3,549,176 | 12/1970 | Conteras | 285/226 |
| 2,707,117 | 4/1955 | Fentrass | 285/226 |
| 3,096,104 | 6/1963 | Browning | 285/226 |

*Primary Examiner*—Samih N. Zaharna
*Assistant Examiner*—T. A. Granger
*Attorney*—George F. Dvorak, Stephen T. Skrydlak and Marden S. Gordon

[57] ABSTRACT

A compression filter press comprising filter frames and filter plates alternately arranged in succession around which an endless filter cloth extends and further comprising expansible and contractible connecting tubes in slurry passages. The expansible and contractible tubes connect the slurry passages between adjacent filter frames to provide an absolutely slurry leak-tight construction.

7 Claims, 4 Drawing Figures 3,730,345
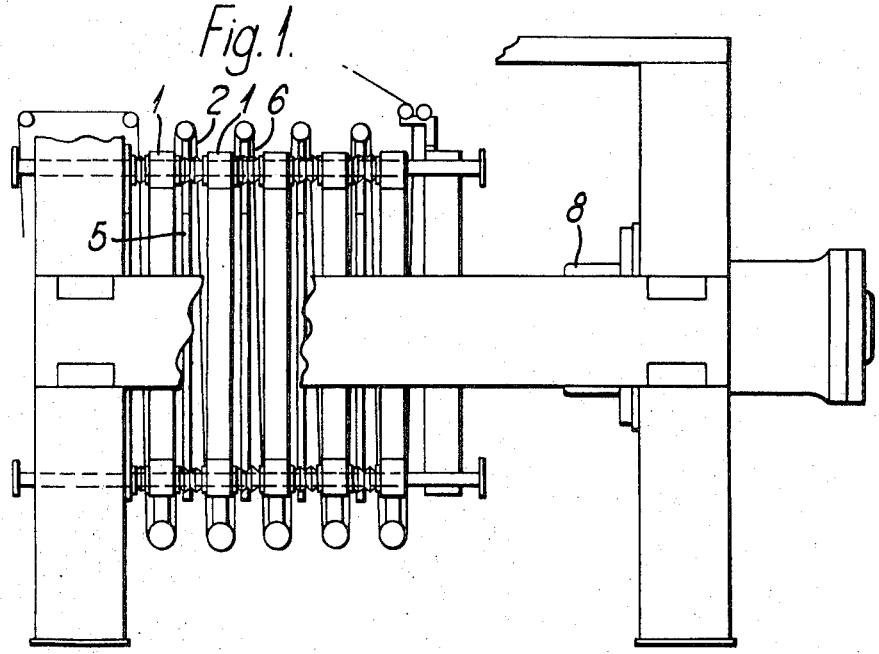
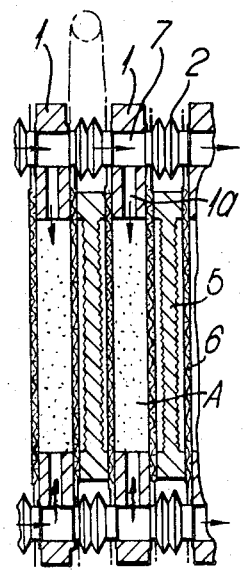 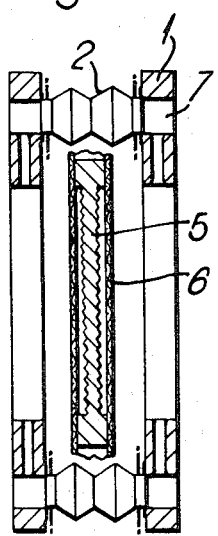 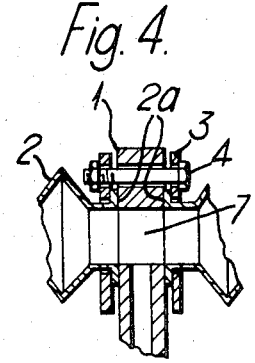

3,730,345

COMPRESSION FILTER PRESS PROVIDED WITH EXPANSIBLE AND CONTRACTIBLE CONNECTING TUBES IN SLURRY PASSAGES

BACKGROUND OF THE INVENTION

1. Field of the Invention

This invention relates to compression filter presses and more particularly to compression filter presses having expansible and contractible connecting tubes provided in slurry inlets of the presses to prevent slurry from leaking out of the presses.

2. Description of the Prior Art

In conventional filter presses, filter plates and filter frames are generally tightened through plate-like or formed packings interposed therebetween to prevent the leakage of slurry occurring at slurry inlets of the filter plates. Frequent opening and closing operations of the filter plates may inherently cause the packings to be deformed and to be damaged which may naturally give rise to the leakage of slurry. In the prior construction, as the slurry passages may generally be closed only when the filter plates are in closed position, the packings may be ineffective in opened positions of the filter plate so that it is unavoidable that the remained slurry in the passages may flow out of the press.

SUMMARY OF THE INVENTION

In order to overcome the above disadvantages in prior art, that is, troubles of the unreliable leak preventing construction, the compression filter press according to the invention comprises filter frames and filter plates alternately arranged in succession around which an endless filter cloth extends and further comprises expansible and contractible connecting tubes connecting slurry passages between the adjacent filter frames to form slurry passages.

An object of the invention is to provide an improved compression filter press capable of preventing not only any leakage of slurry when the slurry is being supplied under the closed condition of the filter plates but also any leakage of the remained slurry in passages when under the opened condition of the filter plates.

The invention will be more fully understood by referring to the following detailed specification and claims taken in connection with the appended drawings.

BRIEF DESCRIPTION OF THE DRAWINGS

FIG. 1 is an elevational view, partly broken away of a preferred embodiment of the compression filter press according to the invention;

FIG. 2 is a sectional view of filter plates of the filter press shown in FIG. 1 in a closed position during slurry supply;

FIG. 3 is a sectional view of the filter plates of the filter press shown in FIG. 1 in an opened position; and FIG. 4 is an enlarged partial sectional view of the end of a filter frame of the filter press showing the mounting expansible and contractible connecting tubes on the filter frame.

DESCRIPTION OF THE PREFERRED EMBODIMENTS

Referring to the drawings showing the preferred embodiment of the invention, especially FIG. 1, the compression filter press comprises filter frames 1 and filter plates 5 alternately arranged in succession around which an endless filter cloth 6 extends, and further comprises expansible and contractible connecting tubes 2 in the form of bellows connecting between the filter frame 1 to form slurry passages therebetween. The connecting tube 2 is made of an elastic material such as rubber, synthetic resin and the like in the form of an expansible and contractible bellows. Flanges 2a at the ends of the connecting tube 2 are tightened to the filter frames 1 through loose flanges 3 by means of bolts 4 to form absolutely leak-tight connections between the connecting tubes and filter plates for the compression filter press according to the invention as shown in FIG. 4.

Referring to FIG. 2, slurry is supplied to slurry inlets 7 and directed through the connecting tubes 2 in the directions of arrows and through inlets 1a of the filter frames into filter chambers A, from which the slurry is then forced through the endless filter cloth 6 as filtrate into the spaces between the filter plates 5 and the filter cloth 6, during which the slurry is filtered through the cloth, while cakes remain in the filter chambers A in the filter frames 1.

The filter press according to the invention can advantageously be applied to a double compression filter press wherein fluid under pressure is forced toward cakes in filter chambers to further squeeze the cakes to a less water contents (not shown).

If a hydraulic cylinder 8 (FIG. 1) is actuated to bring the filter plates 5 into opened positions as shown in FIG. 3, the slurry does not leak out of the press since the slurry passages are connected by means of the expansible and contractible connecting tubes and hermetically closed.

As can be seen from the above description, the length of the bellows of the connecting tube 2 is minimum in the closed position of the plates 1 as shown in FIG. 2 and maximum in the opened position as shown in FIG. 3. In the view point, the bellows may be so designed as to adapt to a length of the opening and closing stroke of the filter plate.

The connecting tube may be replaced with other tube having the same effectiveness as in the above embodiment such as hose, bellows, flexible expansion joint made of rubber, flexible synthetic resin or metals.

In conventional compression filter presses, to avoid the leakage of slurry it is required to tighten slurry inlets of filter plates at the same level as that of slurry inlets of filter frames, which causes the filter plates to be complicated in shape. In contrast herewith, in the filter press according to the invention it is only required for the same purpose to connect the slurry inlets of the filter plates adjacent to each other. As the supplied slurry is fed to the filter plates through the passages formed in the plates, the construction provides greater ease in operation and in opening and closing operation of the filter plates and can completely eliminate any possibility of leakage of slurry and eliminate the need for packings which might be likely to be deformed and damaged.

The filter plate provided with the expansible and contractible connecting tube used in the compression filter press according to the invention can be simplified in configuration which means economical, and ensures reliable operations of the filter press which will bring about significant industrial effects.

While I have described my invention in detail in its preferred embodiment, it will be obvious to those skilled in the art, after understanding my invention, that various changes and modifications may be made therein without departing from the spirit or scope thereof.

I am in the appended claims to cover all such modifications and changes.

I claim:

1. A compression filter press comprising filter frames and filter plates alternately arranged in succession around which an endless filter cloth extends, slurry passages formed in adjacent filter frames, and connecting tubes arranged between said filter frames to straight connect said slurry passages in the adjacent filter frames in a fluid tight manner in both the open and closed positions of said filter press, said connecting tubes being of flexible material with a first end and a second end and expansible and contractible in a direction substantially parallel with the axes of said connecting tubes, said first end of said connecting tubes being connected to a slurry passage in a first filter frame and said second end of said connecting tubes being connected to a slurry passage in a second filter frame spaced apart from said first filter frame whereby a straight connected flow passage is provided between said first and second filter frames both when said frames are spaced apart from each other in the open position of said filter press and when adjacent each other in the closed position of said filter press.

2. A compression filter press as set forth in claim 1, wherein said connecting tubes are expansible and contractible bellows.

3. A compression filter press as set forth in claim 2, wherein said expansible and contractible bellows are made of rubber.

4. A compression filter press as set forth in claim 2, wherein said expansible and contractible bellows are made of flexible synthetic resin.

5. A compression filter press as set forth in claim 1, wherein said connecting tubes are flexible expansion joints.

6. A compression filter press as set forth in claim 1, wherein said connecting tubes are made of flexible synthetic resin.

7. A compression filter press as set forth in claim 1 wherein said filter plates and said filter frames are supported for longitudinal movement toward and away from each other, each of said slurry passages including a passageway extending longitudinally through the associated filter frame alonA a longitudinal axis common to all said passageways, said flexible connecting tubes each connected between said adjacent filter frames in fluid tight communication with said passageways and extending therebetween substantially along said common longutindal axis and adapted for expansible and contractible longitudinally directed movements along a substantial straight line substantially along said common longitudinal axis between said filter frames.

* * * * *